US012610030B2

(12) United States Patent
Yamaguchi

(10) Patent No.: US 12,610,030 B2
(45) Date of Patent: Apr. 21, 2026

(54) CONTROL METHOD FOR PROJECTOR, CONTROL METHOD FOR INFORMATION PROCESSING APPARATUS, AND PROJECTOR

(71) Applicant: SEIKO EPSON CORPORATION, Tokyo (JP)

(72) Inventor: Katsuyoshi Yamaguchi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 107 days.

(21) Appl. No.: 18/175,603

(22) Filed: Feb. 28, 2023

(65) Prior Publication Data

US 2023/0276035 A1 Aug. 31, 2023

(30) Foreign Application Priority Data

Feb. 28, 2022 (JP) ................................. 2022-029145

(51) Int. Cl.
*H04N 9/31* (2006.01)
*G06F 3/0482* (2013.01)

(52) U.S. Cl.
CPC ......... *H04N 9/3185* (2013.01); *G06F 3/0482* (2013.01)

(58) Field of Classification Search
CPC ......... G06F 3/0484–04897; G06F 3/00; G06F 3/048–04897; G03B 21/13; G03B 21/147; G03B 21/562; G03B 21/58; G03B 21/60; G06T 3/08; G06T 2207/30261; G06T 3/40; B60R 2300/8093; B60R 2300/301; H04N 5/2628; H04N 9/3185; H04N 9/3188; H04N 9/3194
See application file for complete search history.

(56) References Cited

U.S. PATENT DOCUMENTS

2003/0222892 A1* 12/2003 Diamond ................. H04N 9/31
345/647
2011/0069234 A1* 3/2011 Kaise ..................... H04N 21/47
348/E5.077
2012/0140189 A1* 6/2012 Hiranuma ............ H04N 9/3185
353/69

(Continued)

FOREIGN PATENT DOCUMENTS

JP 2011-017888 A 1/2011
JP 2011-112862 A 6/2011

(Continued)

OTHER PUBLICATIONS

Epson Product Information Business Projecior (PP Presentation, 2022, 10 pages).

*Primary Examiner* — John W Miller
*Assistant Examiner* — Humam M Satti
(74) *Attorney, Agent, or Firm* — Dority & Manning, P.A.

(57) ABSTRACT

A control method for a projector includes receiving selection of one of a first shape and a second shape as a shape of a projection surface onto which image light is projected, when the first shape is selected, displaying, on the projection surface, a user interface for geometric correction associated with the first shape, and, when the second shape is selected, displaying, on the projection surface, a user interface for geometric correction associated with the second shape.

6 Claims, 10 Drawing Sheets

(56)                    References Cited

U.S. PATENT DOCUMENTS

| 2016/0261835 A1* | 9/2016 | De Leon | ................. G06F 3/014 |
| 2019/0052852 A1* | 2/2019 | Schick | .................... G06T 7/593 |
| 2022/0132071 A1* | 4/2022 | Tanaka | ................. G03B 21/147 |

FOREIGN PATENT DOCUMENTS

| JP | 2013078001 A | 4/2013 |
| JP | 2017-118365 A | 6/2017 |
| JP | 2017-198945 A | 11/2017 |
| JP | 2021-039200 A | 3/2021 |

* cited by examiner

Figure 5:
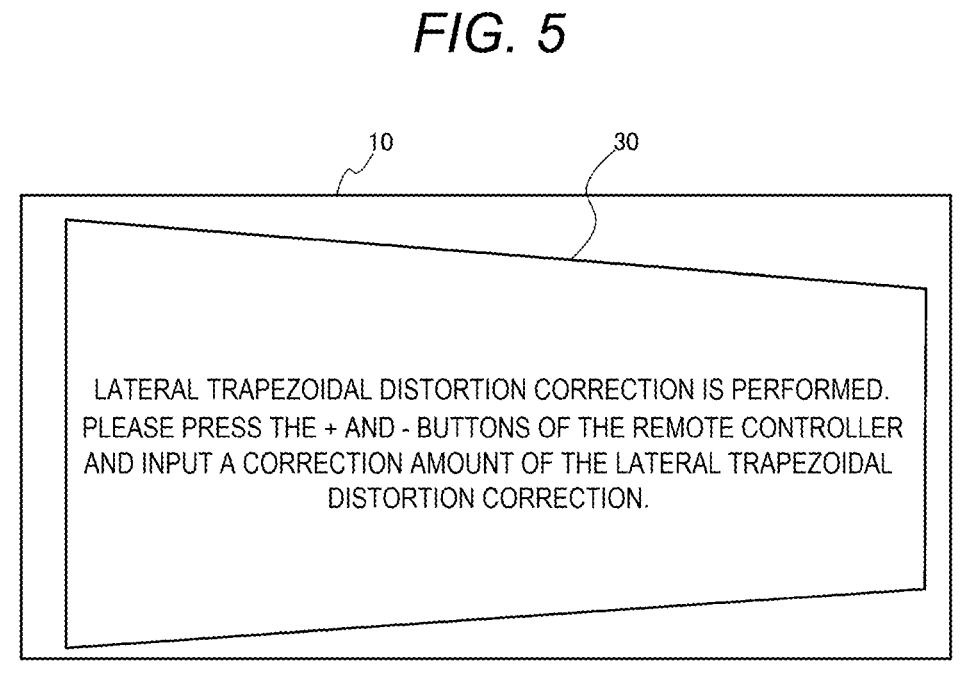

LATERAL TRAPEZOIDAL DISTORTION CORRECTION IS PERFORMED.
PLEASE PRESS THE + AND - BUTTONS OF THE REMOTE CONTROLLER
AND INPUT A CORRECTION AMOUNT OF THE LATERAL TRAPEZOIDAL
DISTORTION CORRECTION.

*FIG. 10*

CONTROL METHOD FOR PROJECTOR, CONTROL METHOD FOR INFORMATION PROCESSING APPARATUS, AND PROJECTOR

The present application is based on, and claims priority from JP Application Serial Number 2022-029145, filed Feb. 28, 2022, the disclosure of which is hereby incorporated by reference herein in its entirety.

BACKGROUND

1. Technical Field

The present disclosure relates to a control method for a projector, a control method for an information processing apparatus, and the projector.

2. Related Art

There has been a projector that starts display of a projection image after correcting the shape of an image to be displayed on a projection surface.

For example, a projector disclosed in JP-A-2013-78001 (Patent Literature 1) discloses correction for dividing an image into a plurality of quadrangular regions, causing a projection surface to display vertexes of the divided quadrangular regions, and moving, based on input operation of a user, the position of the vertex selected by the user. The user selects the number of selectable vertexes according to the shape of the projection surface and changes the size of the quadrangular regions for dividing the image.

However, the user does not always use a screen as the projection surface and sometimes uses a wall surface or the like in a room as the projection surface. A type of necessary shape correction is different depending on a positional relation between the projector and the projection surface. Accordingly, it is difficult for the user to select optimum shape correction.

SUMMARY

The present disclosure is a control method for a projector for executing: receiving selection of one of a first projection surface shape and a second projection surface shape as a shape of a projection surface onto which image light is projected; when receiving the selection of the first projection surface shape, displaying, on the projection surface, a user interface for geometric correction associated with the first projection surface shape; and, when receiving the selection of the second projection surface shape, displaying, on the projection surface, a user interface for geometric correction associated with the second projection surface shape.

The present disclosure is a control method for an information processing apparatus for executing: receiving selection of one of a first projection surface shape and a second projection surface shape as a shape of a projection surface onto which image light is projected; when receiving the selection of the first projection surface shape, outputting information concerning geometric correction associated with the first projection surface shape; and, when receiving the selection of the second projection surface shape, outputting information concerning geometric correction associated with the second projection surface shape.

The present disclosure is a projector including: an optical device; and a controller configured to execute: receiving operation for selecting a shape of a projection surface onto which image light is projected; when receiving operation for selecting a first projection surface shape as the shape of the projection surface, causing, using the optical device, the projection surface to display a user interface for geometric correction associated with the first projection surface shape; and, when receiving operation for selecting a second projection surface shape as the shape of the projection surface, causing, using the optical device, the projection surface to display a user interface for geometric correction associated with the second projection surface shape.

BRIEF DESCRIPTION OF THE DRAWINGS

FIG. 5 is a diagram showing a user interface corresponding to lateral trapezoidal distortion correction.

FIG. 10 is a diagram showing a system configuration of a modification.

DESCRIPTION OF EXEMPLARY EMBODIMENTS

Figure 1:
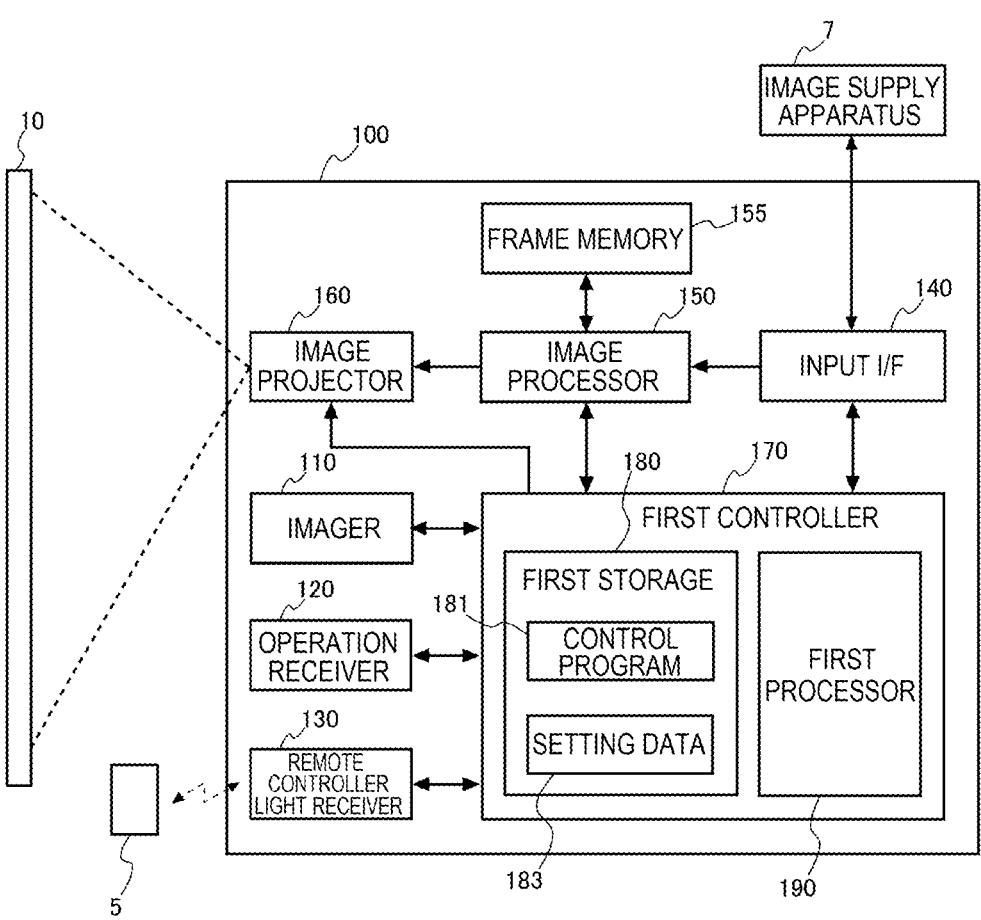
FIG. 1 is a diagram showing a configuration of a projector.

FIG. 1 is a block diagram showing a configuration of a projector 100.

The projector 100 includes an imager 110, an operation receiver 120, a remote controller light receiver 130, an input interface 140, an image processor 150, an image projector 160, and a first controller 170. In the following explanation, interface is abbreviated as I/F.

The imager 110 includes an imaging element and a processing circuit and images a range including a projection surface 10 and generates a captured image. Illustration of the imaging element and the processing circuit is omitted. The imaging element is configured by a CCD (Charge Coupled Device) or a CMOS (Complementary Metal Oxide Semiconductor). The processing circuit processes a signal output by the imaging element to generate a captured image.

The operation receiver 120 includes a plurality of operation keys for a user to give various instructions to the projector 100. As the operation keys included in the operation receiver 120, there are a power key for switching ON and OFF of a power supply and a menu key for causing the projector 100 to display a menu image for performing various kinds of setting. When the user operates any one of the various operation keys of the operation receiver 120, the operation receiver 120 outputs an operation signal corresponding to received operation content to the first controller 170.

The remote controller light receiver 130 receives an infrared signal transmitted from a remote controller 5 and outputs an operation signal corresponding to operation content indicated by the received infrared signal to the first controller 170.

The remote controller 5 includes operation pieces for performing operation on a user interface. The operation pieces include, for example, a cross key for inputting upward, downward, left, and right directions and a plus button and a minus button for inputting an increase and a decrease of a numerical value. When any one of the operation pieces is operated by the user, the remote controller 5 transmits an infrared signal corresponding to the operated operation piece.

The input I/F 140 is, for example, an interface for image data reception including a port adapted to a standard such as HDMI and an interface circuit. HDMI is a registered trademark. The input I/F 140 is coupled to a cable for image transmission and receives image data supplied from an image supply apparatus 7. The input I/F 140 outputs the received image data to the image processor 150.

A frame memory 155 is connected to the image processor 150. The image processor 150 loads, in the frame memory 155, image data input from the input I/F 140. The frame memory 155 is configured by, for example, an SDRAM (Synchronous Dynamic Random Access Memory).

The image processor 150 performs, on the image data loaded in the frame memory 155, image processing such as resolution conversion processing, resize processing, correction of distortion aberration, shape correction processing, digital zoom processing, and adjustment of a tint and luminance of an image. The image processor 150 executes image processing designated by the first controller 170 and, according to necessity, performs processing using parameters input from the first controller 170. Naturally, the image processor 150 is capable of combining and executing a plurality of kinds of image processing among the kinds of image processing explained above. The image processor 150 reads out, from the frame memory 155, image data for which processing has ended and outputs the read-out image data to a panel driver 167 of the image projector 160.

The image processor 150 and the frame memory 155 are configured by, for example, an integrated circuit. Examples of the integrated circuit include an LSI (Large Scale Integrated Circuit), an ASIC (Application Specific Integrated Circuit), a PLD (Programmable Logic Device), an FPGA (Field-Programmable Gate Array), and an SoC (System-on-a-chip). An analog circuit may be included in a part of a configuration of the integrated circuit. The first controller 170 and the integrated circuit may be combined.

Figure 2:
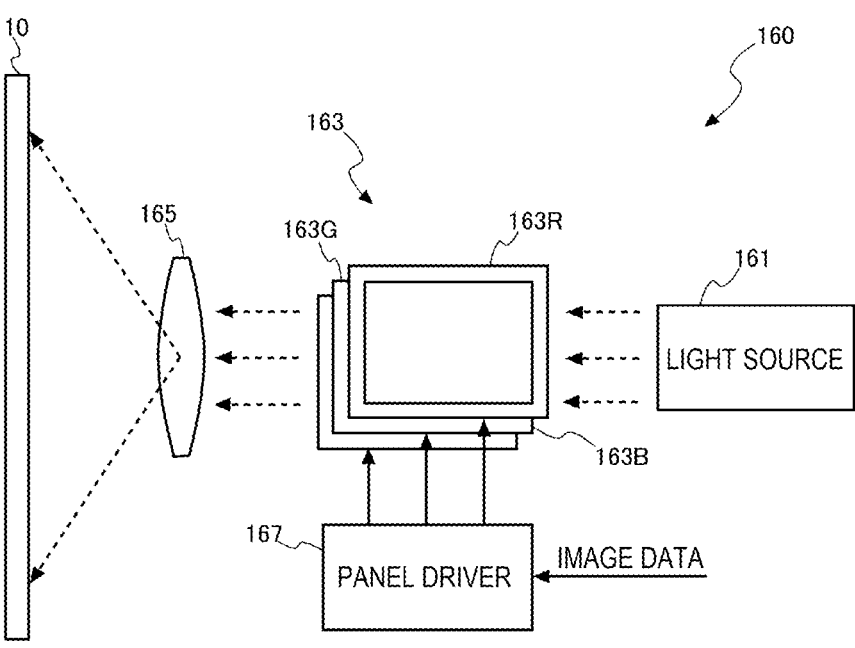
FIG. 2 is a diagram showing a configuration of an image projector.

FIG. 2 is a diagram showing a schematic configuration of the image projector 160. The image projector 160 is equivalent to an optical device.

A configuration of the image projector 160 is explained with reference to FIG. 2.

The image projector 160 modulates light emitted from a light source 161 to generate image light, enlarges the generated image light with an optical unit 165, and projects the enlarged image light. The image projector 160 includes the light source 161, three liquid crystal panels 163R, 163G, and 163B functioning as optical modulation devices, the optical unit 165, and the panel driver 167. In the following explanation, when the three liquid crystal panels 163R, 163G, and 163B included in the projector 100 are correctively referred to, the three liquid crystal panels 163R, 163G, and 163B are described as liquid crystal panel 163.

The light source 161 includes a discharge-type light source lamp such as an ultrahigh pressure mercury lamp or a metal halide lamp or a solid-state light source such as a light emitting diode or a semiconductor laser. Light emitted from the light source 161 is made incident on the liquid crystal panel 163. Each of the liquid crystal panels 163R,

163G, and 163B is configured by, for example, a transmissive liquid crystal panel in which liquid crystal is encapsulated between a pair of transparent substrates. The liquid crystal panel 163R modulates red light, the liquid crystal panel 163G modulates green light, and the liquid crystal panel 163B modulates blue light. In the liquid crystal panels 163R, 163G, and 163B, pixel regions including pluralities of pixels arrayed in a matrix shape are formed. A driving voltage can be applied to the liquid crystal for each of the pixels.

The image data output by the image processor 150 is input to the panel driver 167. The panel driver 167 applies a driving voltage corresponding to the input image data to the pixels in the pixel regions and sets the pixels to light transmittance corresponding to image information. The light emitted from the light source 161 is transmitted through the pixel regions of the liquid crystal panels 163R, 163G, and 163B to thereby be modulated for each of the pixels. Image lights corresponding to the image information are formed for each of the color lights. The formed image lights of the colors are combined for each of the pixels by a not-shown color combination optical system to be image light representing a color image. The image light is enlarged and projected onto the projection surface 10 by the optical unit 165. Consequently, a projection image, which is an image corresponding to the image light, is displayed on the projection surface 10.

Referring back to FIG. 1, the configuration of the projector 100 is continuously explained.

The first controller 170 is a computer device including a first storage 180 and a first processor 190.

The first storage 180 includes a RAM (Random Access Memory) and a ROM (Read Only Memory). The RAM is used for temporary storage of various data and the like. The ROM stores a control program 181 for controlling the operation of the projector 100 and various setting data 183. The first storage 180 temporarily stores a captured image generated by the imager 110.

The first processor 190 is an arithmetic processing device configured by a CPU (Central Processing Unit) or an MPU (Micro-Processing Unit). The first processor 190 executes a control program 181 and controls the units of the projector 100. The first processor 190 may be configured by a single processor and can also be configured by a plurality of processors. The first processor 190 may be configured by an SoC (System-on-a-chip) integrated with a part or the entire first storage 180 and other circuits. The first processor 190 may be configured by a combination of a CPU that executes a program and a DSP that executes predetermined arithmetic processing. Further, the first processor 190 may be configured by implementing all of functions of the first processor 190 in hardware or may be configured using a programmable device.

When the power key provided in the operation receiver 120 is turned on and electric power is supplied to the projector 100, the first controller 170 causes the projection surface 10 to display a menu screen. When the operation receiver 120 includes a display panel such as a liquid crystal panel, the first controller 170 may cause the display panel to display the menu screen.

On the menu screen, a selection field for selecting shape conditions, which are conditions concerning the shape of the projection surface 10, and installation conditions, which are conditions concerning an installation state of the projector 100, is displayed.

The shape conditions for the projection surface 10 include a shape having a projection, that is, a protrusion in a part of the projection surface 10 and a shape having a recess, that is, a hollow in a part of the projection surface 10. In the following explanation, the shape conditions are respectively referred to as "projection shape" and "hollow shape". The projection shape is equivalent to the first projection surface shape or the first shape. The hollow shape is equivalent to the second projection surface shape or the second shape.

When a screen is used as the projection surface 10, the shape conditions for the projection surface 10 include a condition concerning whether a screen is a portable screen or a fixed screen. In the following explanation, the shape conditions are respectively referred to as "portable screen" and "fixed screen".

It is assumed that an inner wall including, for example, pillars of a house is used as the projection surface 10 having the projection in a part. It is assumed that an inner wall of a house having a hollow in a part is used as the projection surface 10 including the hollow in a part. For example, when an inner wall of a house is used as the projection surface 10, a hollow is sometimes formed in the inner wall because, for example, an object is unintentionally crushed into the inner wall.

The portable screen is a winding-type screen. The portable screen includes a winding mechanism in an upper part or a lower part of the screen. When the portable screen is used, the screen is pulled out from the winding mechanism and used. The fixed screen is a screen fixed to a wall surface or the like in a room. Since the portable screen is wound by the winding mechanism, in some case, creases occur on a screen surface or the screen surface undulates.

Figure 3:
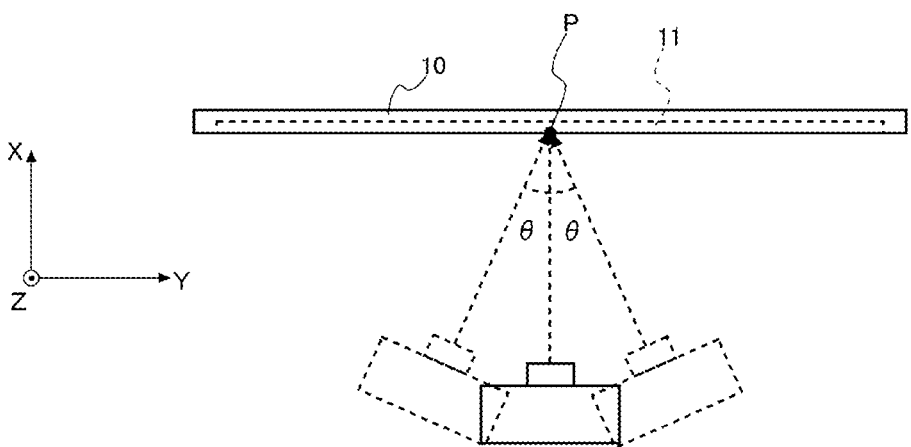
FIG. 3 is a diagram for explaining installation conditions for the projector with respect to a projection surface.

FIG. 3 is a diagram showing a state in which the projector 100 and the projection surface 10 are viewed from above.

The installation conditions for the projector 100 include "front installation" and "oblique installation".

The front installation means a state in which the projector 100 is installed in the front of the projection surface 10.

The front installation is explained with reference to FIG. 3. In FIG. 3, three axes of an X axis, a Y axis, and a Z axis orthogonal to one another are shown. The X axis is a direction corresponding to the normal direction of the projection surface 10. The Y axis is a direction corresponding to the horizonal direction of the projection surface 10. The Z axis is a direction corresponding to the vertical direction.

A range 11 indicated by a broken line in FIG. 3 indicates a range in the horizontal direction of the projection surface 10 onto which a projection image is projected by the projector 100. This range is referred to as projection region.

When a position corresponding to the center of projected light of a projection lens or the center of a projection image is set as a point P on the projection surface 10, an angle formed by the normal of the projection surface 10 at the point P and the optical axis of the projected light is represented as an angle θ. The front installation means a case in which, in the normal direction of the projection surface 10, the angle θ formed by the optical axis of the projection lens of the projector 100 and the normal of the projection surface at the center P in the Y-axis direction of the projection region 11 is within a preset angle range. The angle range of the angle θ can be set in, for example, a range of −10 degrees or more and +10 degrees or less. The front installation is equivalent to the first installation state. The oblique installation means a case in which the angle θ formed by the optical axis of the projection lens of the projector 100 and the normal of the projection surface at the center P in the Y-axis direction of the projection region 11 is outside the preset angle range. The oblique installation is equivalent to the second installation state.

When a shape condition and an installation condition are input, the first controller 170 causes, according to the setting data 183, the projection surface 10 to display a user interface for geometric correction associated with the input shape condition and the input installation condition.

When the "hollow shape" is selected as the shape condition and the "front installation" is selected as the installation condition, the first controller 170 selects point correction as geometric correction processing and causes the projection surface 10 to display a user interface corresponding to the point correction. The point correction is selected as the geometric correction processing because a hollow part of the projection surface 10 can be corrected in a pinpoint manner by the point correction.

Figure 4:
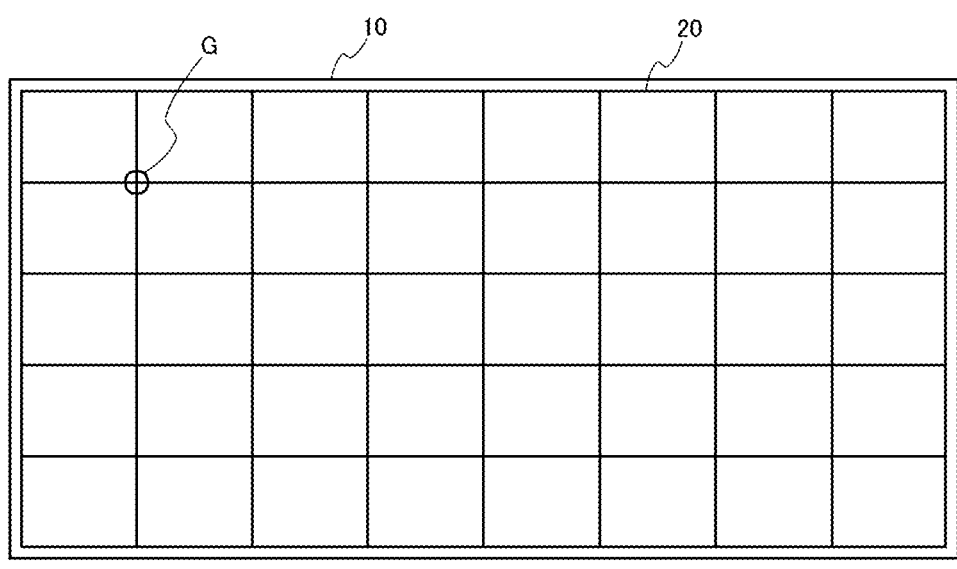
FIG. 4 is a diagram showing a user interface corresponding to point correction.

FIG. 4 is a diagram showing a user interface for the point correction.

The point correction is a correction method for correcting partial distortion of an image to be projected onto the projection surface 10. In the point correction, a projection image 20 segmented in a lattice shape is displayed on the projection surface 10 as the user interface. The user operates the cross key of the remote controller 5 to select an intersection of a lattice point to be corrected. A lattice point G surrounded by a white circle shown in FIG. 4 indicates the lattice point selected by the operation of the remote controller 5. After operating the remote controller 5 to select the lattice point, the user presses the cross key provided in the remote controller 5. That is, the user presses the cross key in a direction in which the user desires to move the selected lattice point G. The first controller 170 moves, in the direction in which the cross key is pressed, a pixel of the projection image 20 drawn in the position of the lattice point G of the liquid crystal panel 163 or a pixel of the projection image 20 drawn in the position of the lattice point G and peripheral pixels of the pixel. The first controller 170 continues the processing while the cross key is pressed.

When the operation of the cross key ends, the first controller 170 generates a parameter associating a pixel of image data and a pixel of the liquid crystal panel 163 on which the image data is drawn and outputs the generated parameter to the image processor 150. The image processor 150 transforms the image data according to the parameter input from the first controller 170. When the point correction is performed, it is possible to select "3×3", "5×5", "9×9", or the like as the number of intersections.

When the "hollow shape" is selected as the shape condition and the "oblique installation" is selected as the installation condition, after executing lateral trapezoidal distortion correction, the first controller 170 selects, as the geometric correction processing, correction for executing the point correction. The first controller 170 causes the projection surface 10 to display a user interface corresponding to the lateral trapezoidal distortion correction.

The geometric correction processing explained above is selected because, if it is attempted to eliminate distortion in a lateral trapezoidal shape only with the point correction, a large number of correction points have to be corrected and a processing load increases. It is possible to reduce the processing load by executing the lateral trapezoidal distortion correction, adjusting a rough shape of a projection image, and, thereafter, correcting a hollow part with the point correction.

The lateral trapezoidal distortion correction is processing for correcting the difference between the length of the left and right sides of a projection image to be projected onto the projection surface 10 and correcting the projection image to be rectangular. For example, when the projector 100 is installed obliquely to the projection surface 10, the lengths of the left side and the right side of the projection surface 10 are different and the projection image is not rectangular. The left and the light of the projection image respectively correspond to, for example, the left and the right of the user facing the projection surface 10.

FIG. 5 is a diagram showing the user interface corresponding to the lateral trapezoidal distortion correction.

The first controller 170 causes the projection surface 10 to display a predetermined projection image 30 as the user interface corresponding to the lateral trapezoidal distortion correction. The projection image 30 only has to be an image in which the shape of a projection image to be displayed on the projection surface 10 by the projector 100, in particular, the lengths of both the left and right sides of the projection image 30 can be recognized. Guidance for urging the user to input a correction amount of the lateral trapezoidal distortion correction by operating the plus button and the minus button of the remote controller 5 may be displayed on the projection surface 10.

The user operates the plus button or the minus button provided in the remote controller 5. When the plus button or the minus button of the remote controller 5 is operated, the first controller 170 changes the length of the left side or the right side of the projection image 30 drawn on the liquid crystal panel 163. When the operation of the plus button or the minus button of the remote controller 5 ends, the first controller 170 generates a parameter associating the pixel of the image data and the pixel of the liquid crystal panel 163 on which the image data is drawn and outputs the generated parameter to the image processor 150. The image processor 150 transforms the image data according to the parameter input from the first controller 170.

When the "projection shape" is selected as the shape condition and the "front installation" is selected as the installation condition, the first controller 170 selects corner projection correction as the geometric correction processing and causes the projection surface 10 to display a user interface corresponding to the corner projection correction.

The corner projection correction is selected as the geometric correction processing because, by executing the corner projection correction capable of performing correction according to a protrusion of the projection surface 10, it is possible to correctly correct a projection image even if the projection surface 10 has a protrusion.

Figure 6:
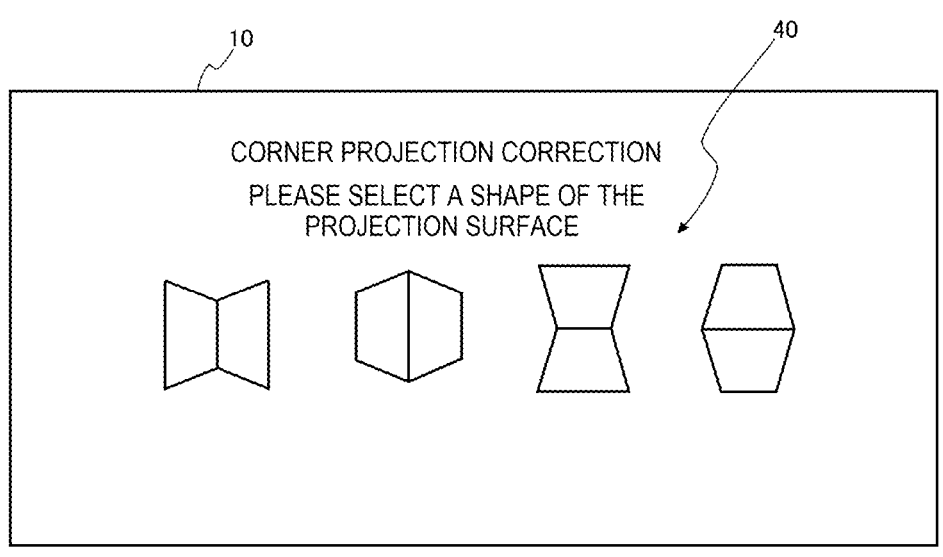
FIG. 6 is a diagram showing a user interface corresponding to corner projection correction.

FIG. 6 is a diagram showing the user interface corresponding to the corner projection correction.

On the user interface corresponding to the corner projection correction, as shown in FIG. 6, a projection image 40 showing a list of shapes of the projection surface 10 correctable by the projector 100 is displayed. The user operates the remote controller 5 to select a shape corresponding to a projection of an actual projection surface 10. When one of the shapes of the projection surface 10 is selected, the first controller 170 causes the image processor 150 to execute, on image data loaded in the frame memory 155, correction corresponding to the selected shape.

When the "projection shape" is selected as the shape condition and the "oblique installation" is selected as the installation condition, after executing the lateral trapezoidal distortion correction, the first controller 170 selects, as the geometric correction processing, correction for executing the corner projection correction. The first controller 170 causes the projection surface 10 to display the user interface corresponding to the lateral trapezoidal distortion correction.

The geometric correction processing explained above is selected because, when the lateral trapezoidal distortion correction is performed after the corner projection correction for performing correction according to the protrusion of the projection surface 10 is executed, the corner projection correction needs to be performed again.

When the "portable screen" is selected as the shape condition and the "front installation" is selected as the installation condition, after executing the quick corner correction, the first controller 170 selects, as the geometric correction processing, correction for executing point correction. The first controller 170 causes the projection surface 10 to display a user interface corresponding to the quick corner correction.

The geometric correction processing explained above is selected because a projection image can be aligned with four sides of a screen with the quick corner correction. Since distortion sometimes occurs in a surface in the portable screen, the distortion can be completely eliminated by performing readjustment with the point correction in which a plurality of correction points are present and a distortion part can be finely corrected.

Figure 7:
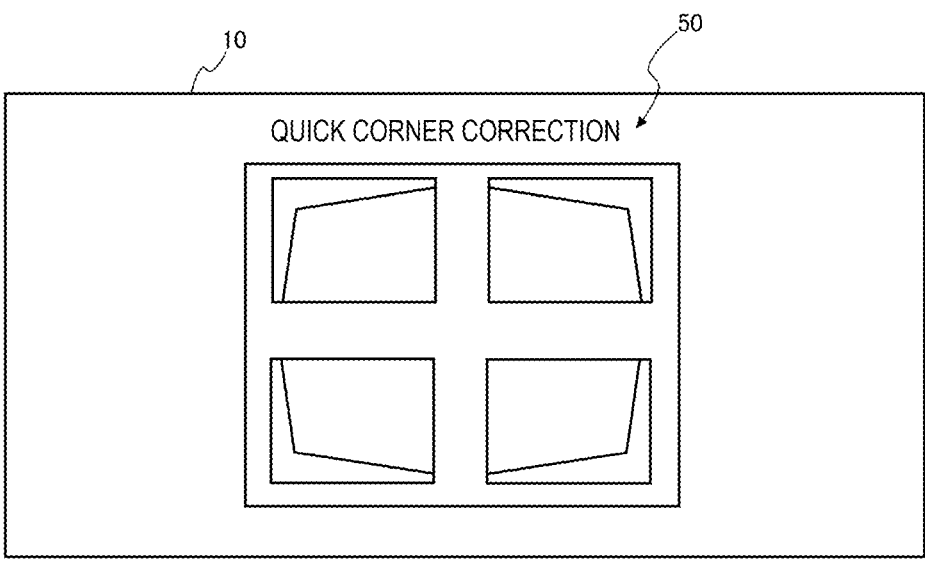
FIG. 7 is a diagram showing a user interface corresponding to quick corner correction.

FIG. 7 is a diagram showing the user interface corresponding to the quick corner correction.

In the user interface corresponding to the quick corner correction, a selection screen 50 for selecting a corner of a projection image to be corrected is displayed on the projection surface 10. The user operates the remote controller 5 to select a corner to be corrected.

Figure 8:
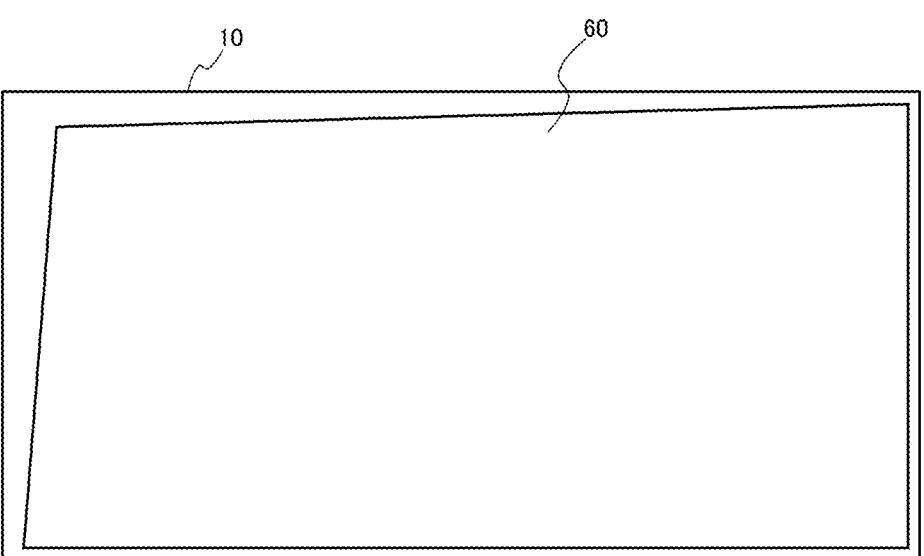
FIG. 8 is a diagram showing a user interface corresponding to the quick corner correction.

FIG. 8 is a diagram showing a user interface corresponding to the quick corner correction.

When a corner to be corrected is selected, the first controller 170 causes the projection surface 10 to display a projection image 60. The projection image 60 only has to be an image in which the user can recognize a projection region that is a region of the projection surface 10 where the projection image 60 is displayed.

The user presses the cross key in a direction in which the user desires to move the selected corner. The first controller 170 moves the corner of the projection image 60 drawn on the liquid crystal panel 163 in the direction in which the cross key is pressed. The controller 170 continues the processing while the cross key is pressed.

When the operation of the cross key ends, the first controller 170 generates a parameter associating a pixel of image data and a pixel of the liquid crystal panel 163 on which the image data is drawn and outputs the generated parameter to the image processor 150. The image processor 150 transforms the image data according to the parameter input from the first controller 170.

When the "portable screen" is selected as the shape condition and the "oblique installation" is selected as the installation condition, after executing the lateral trapezoidal distortion correction, the first controller 170 selects, as the geometric correction processing, correction for executing the point correction. The first controller 170 causes the projection surface 10 to display the user interface corresponding to the lateral trapezoidal distortion correction.

The geometric correction processing explained above is selected because, when it is attempted to eliminate distortion of a lateral trapezoidal shape only with the point correction, a large number of correction points have to be corrected and a processing load increases. Therefore, it is possible to reduce the processing load by executing the lateral trapezoidal distortion correction, adjusting a rough shape of a projection image, and, thereafter, correcting a hollow part with the point correction.

When the "fixed screen" is selected as the shape condition and the "front installation" is selected as the installation condition, the first controller 170 selects frame fit processing as the geometric correction processing to be executed. Accordingly, the first controller 170 causes the projection surface 10 to display a user interface corresponding to the frame fit processing. Since the frame fit processing is automatically executed, the first controller 170 causes the projection surface 10 to display a projection image for informing that the frame fit processing is being executed.

The frame fit processing is selected because, when the projection surface 10 is the fixed screen, since the projection surface 10 does not have a hollow or a protrusion and is a plane, the projection image only has to be aligned with the projection region of the projection surface 10.

When the frame fit processing is selected, the first controller 170 causes the imager 110 to image the projection surface 10 and generate a captured image. The first controller 170 receives the captured image generated by the imager 110 and detects a region of the projection surface 10 based on the received captured image. In general, when a screen is used as the projection surface 10, a difference occurs in a luminance value between a projection region where a projection image is displayed and a background region that is in contact with the projection region on the outer side. The first controller 170 detects a projection region based on a difference in a luminance value of the captured image and corrects image data according to the shape of the detected projection region.

When the "fixed screen" is selected as the shape condition and the "oblique installation" is selected as the installation condition, after executing the lateral trapezoidal distortion correction, the first controller 170 selects, as the geometric correction processing, correction for executing the frame fit processing. The first controller 170 causes the projection surface 10 to display the user interface corresponding to the lateral trapezoidal distortion correction.

The geometric correction processing explained above is selected because, when the projection surface 10 is the fixed screen, since the projection surface 10 does not have a hollow or a protrusion and is a plane, the projection image only has to be aligned with the projection region of the projection surface 10. When the oblique installation is selected as the installation condition, since lateral trapezoidal distortion occurs in a projection image, an operation for correcting the trapezoidal distortion in the lateral direction and, thereafter, aligning the projection image with the projection region of the projection surface 10 is performed.

The installation conditions for the projector 100 include, in addition to the conditions explained above, "proximity installation" for installing the projector 100 such that the distance between the projection lens included in the projector 100 and the projection surface 10 is equal to or shorter than a preset distance. The proximity installation is equivalent to the third installation state. The proximity installation corresponds to the front installation and is an installation state in which the distance between the projection surface 10 and the lens included in the projector 100 is shorter than a distance between the projection surface 10 and the lens included in the projector 100 assumed in the front installation. The distance between the projection lens and the projection surface 10 in the proximity installation can be set to, for example, 2 m or less.

In the case of the proximity installation, the distance between the projection lens included in the projector 100 and the projection surface 10 is a distance within a preset range. That is, a range of the projection surface 10 in which a projection image is projected by the projection lens can be specified. Accordingly, before shipment of the projector 100, the first controller 170 causes the projector 100 to execute calibration of geometric correction and causes the first storage 180 to store parameters generated by the calibration.

When the proximity installation is selected as the installation condition, the first controller 170 selects the point correction after executing the geometric correction processing using the parameters stored by the first storage 180. The first controller 170 causes the projection surface 10 to display the user interface corresponding to the point correction.

The geometric correction processing explained above is selected because it is possible to reduce the processing load by executing geometric correction corresponding to the proximity installation in advance to adjust a rough shape of a projection image and, thereafter, the user correcting a hollow part of the projection surface 10 with the point correction.

Figure 9:
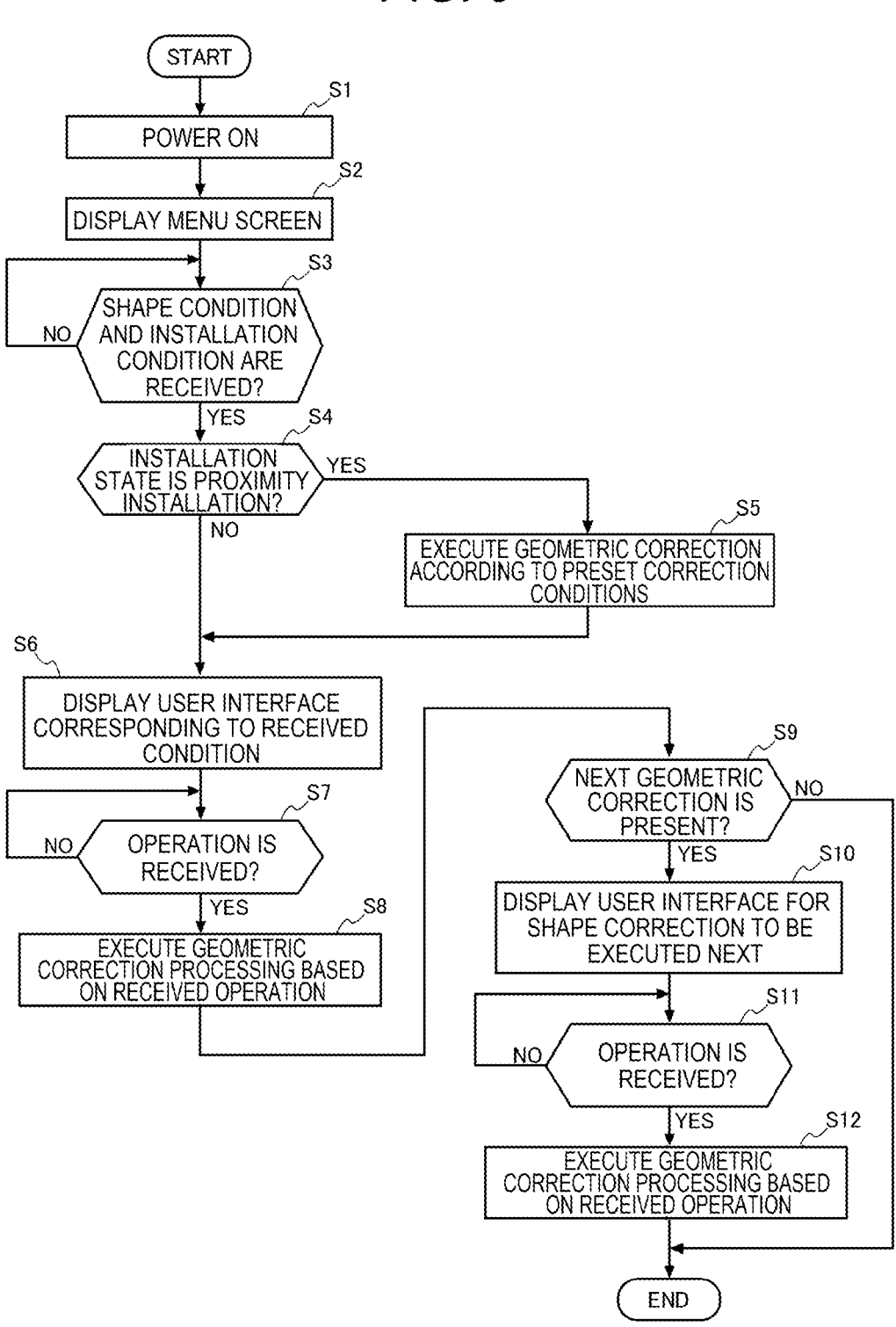
FIG. 9 is a flowchart showing the operation of the projector.

FIG. 9 is a flowchart showing the operation of the projector 100.

The operation of the projector 100 is explained with reference to the flowchart of FIG. 9.

When the projector 100 is turned on (step S1) and starts, the first controller 170 causes the projection surface 10 to display a menu screen (step S2). The menu screen is a screen on which shape conditions and installation conditions can be selected by operation of the remote controller 5.

Subsequently, the first controller 170 determines whether selection of a shape condition and an installation condition is received (step S3). When selection of a shape condition and an installation condition is not received (NO in step S3), the first controller 170 stays on standby until selection of a shape condition and an installation condition is received.

When receiving selection of a shape condition and an installation condition (YES in step S3), the first controller 170 determines whether a received installation state is the proximity installation (step S4).

When the received installation state is the proximity installation (YES in step S4), the first controller 170 executes the geometric correction processing using the parameters stored by the first storage 180 (step S5). When the geometric correction processing ends, the first controller 170 causes the projection surface 10 to display a user interface for geometric correction processing corresponding to the proximity installation (step S6).

When the received installation state is not the proximity installation (NO in step S4), the first controller 170 causes the projection surface 10 to display a user interface for geometric correction processing corresponding to the received shape condition and the received installation condition (step S6).

Subsequently, the first controller 170 determines whether operation of the remote controller 5 is received (step S7). The user inputs, with the remote controller 5, operation for executing the selected geometric correction processing. For example, when the selected geometric correction processing is the quick corner correction, the operation is operation for selecting a corner to be corrected and pressing the cross key in a direction in which the user desires to move the selected corner. When operation of the remote controller 5 is not received (NO in step S7), the first controller 170 stays on standby until operation of the remote controller 5 is received.

When receiving operation of the remote controller 5 (YES in step S7), the first controller 170 executes the geometric correction processing based on the received operation (step S8). The first controller 170 determines whether geometric correction processing to be executed next is present (step S9). That is, the first controller 170 determines whether a plurality of kinds of geometric correction such as the quick corner correction and the point correction are selected as the geometric correction processing.

When geometric correction processing to be executed next is absent (NO in step S9), the first controller 170 ends this processing flow. When geometric correction processing to be executed next is present (YES in step S9), the first controller 170 causes the projection surface 10 to display a user interface corresponding to the geometric correction processing to be executed next (step S10).

Subsequently, the first controller 170 determines whether operation of the remote controller 5 is received (step S11). The user inputs, with the remote controller 5, operation for executing the selected geometric correction processing. For example, when the geometric correction processing is the point correction, the user operates the remote controller 5 to select the lattice point G to be corrected and presses the cross key in a direction in which the user desires to move the selected lattice point G. When operation of the remote controller 5 is not received (NO in step S11), the first controller 170 stays on standby until operation of the remote controller 5 is received.

When receiving operation of the remote controller 5 (YES in step S11), the first controller 170 executes the geometric correction processing based on the received operation (step S12) and ends the processing flow.

As explained above, the projector 100 in this embodiment includes the first controller 170 that executes processing explained below.

The first controller 170 receives selection of one of the first projection surface shape and the second projection surface shape as the shape of the projection surface 10 onto which image light is projected.

When receiving the selection of the first projection surface shape, the first controller 170 displays, on the projection surface 10, a user interface for geometric correction associated with the first projection surface shape.

When receiving the selection of the second projection surface shape, the first controller 170 displays, on the projection surface 10, a user interface for geometric correction associated with the second projection surface shape.

With this configuration, one of the first projection surface shape and the second projection surface shape is selected as the shape of the projection surface 10, whereby the user interface for the geometric correction corresponding to the selected first projection surface shape or second projection surface shape is displayed. Accordingly, the user can cause the projector 100 to execute geometric correction corresponding to the shape of the projection surface 10.

When the user selects geometric correction not corresponding to the shape of the projection surface 10, distortion of a projection image is maintained and another kind of geometric correction is performed. Therefore, a time required for the geometric correction can be reduced.

The first controller 170 receives selection of one of the first installation state and the second installation state as the installation state of the projector 100.

When receiving selection of the first installation state and the first projection surface shape, the first controller 170 displays, on the projection surface 10, a user interface for geometric correction associated with the first installation state and the first projection surface shape.

When receiving selection of the first installation state and the second projection surface shape, the first controller 170 displays, on the projection surface 10, a user interface for geometric correction associated with the first installation state and the second projection surface shape.

When receiving selection of the second installation state and the first projection surface shape, the first controller 170 displays, on the projection surface 10, a user interface for geometric correction associated with the second installation state and the first projection surface shape.

When receiving selection of the second installation state and the second projection surface shape, the first controller 170 displays, on the projection surface 10, a user interface for geometric correction associated with the second installation state and the second projection surface shape.

With this configuration, by selecting the shape of the projection surface 10 and the installation state of the projector 100, a user interface for geometric correction corresponding to the selected shape and the selected installation state is displayed. Accordingly, the user can cause the projector 100 to execute geometric correction corresponding to the shape of the projection surface 10 and the installation state of the projector 100.

The first controller 170 receives selection of the proximity installation as the installation state of the projector 100. When receiving the selection of the proximity installation, the first controller 170 executes the geometric correction processing according to correction conditions associated with a preset installation state of the proximity installation.

The installation state of the proximity installation is a state in which the distance between the projection surface 10 and the projection lens included in the projector 100 satisfies a preset condition.

With this configuration, by selecting the proximity installation as the installation state of the projector 100, it is possible to cause the projector 100 to execute a part of the geometric correction processing corresponding to the installation state of the proximity installation before operation of the user interface is performed.

The first projection surface shape is the shape of the projection surface 10 including a projection. The second projection surface shape is the shape of the projection surface 10 including a hollow.

With this configuration, when the first projection surface shape is the shape of the projection surface 10 including the projection or the shape of the projection surface 10 including the hollow, it is possible to cause the projector 100 to execute geometric correction processing corresponding to the shape of the projection surface 10.

The first installation state is an installation state in which an angle formed by the optical axis of the projection lens included in the projector 100 and the projection surface 10 is within a preset range. The second installation state is an installation state in which the angle formed by the optical axis of the projection lens and the projection surface 10 is larger than the preset range.

With this configuration, it is possible to cause the projector 100 to execute geometric correction processing corresponding to the installation state of the projector 100.

Modification

Figure 10:
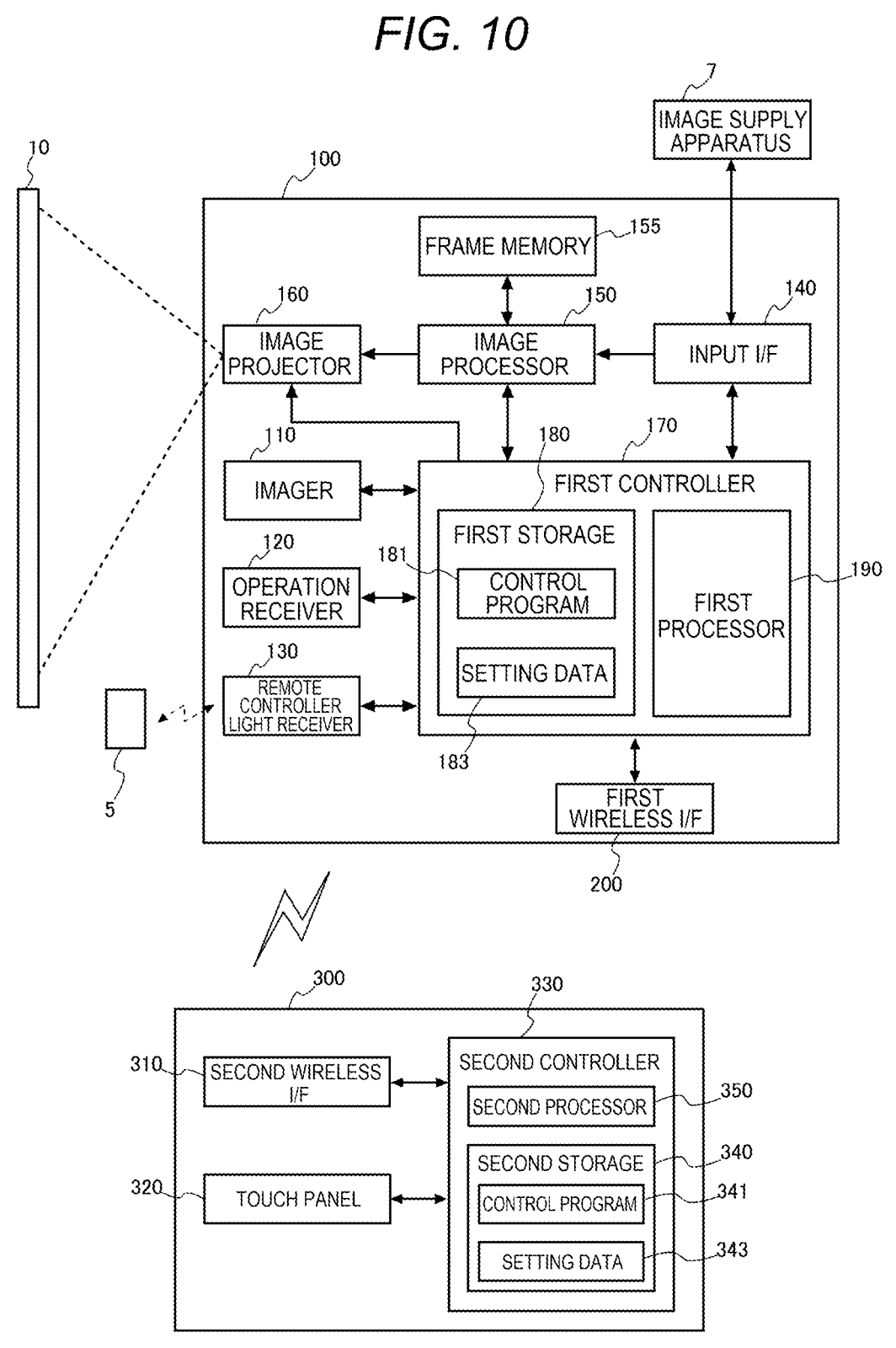

FIG. 10 is a block diagram showing a system configuration of a modification.

In the embodiment explained above, the first controller 170 included in the projector 100 causes the projection surface 10 to display the user interface corresponding to the shape condition and the installation condition received by the remote controller 5. This modification includes the projector 100 and an information processing apparatus 300. A second controller 330 of the information processing apparatus 300 receives a shape condition and an installation condition and notifies information concerning geometric correction processing corresponding to the received shape condition and the received installation condition to the projector 100.

The projector 100 in the modification shown in FIG. 10 includes a first wireless I/F 200. The first wireless I/F 200 includes an interface circuit adapted to a communication standard of short-range wireless communication such as Wi-Fi or Bluetooth. Wi-Fi and Bluetooth are registered trademarks.

The information processing apparatus 300 includes a second wireless I/F 310, a touch panel 320, and a second controller 330. As the information processing apparatus 300, for example, a smartphone, a tablet personal computer, a notebook personal computer, or a desktop personal computer can be used.

The second wireless I/F 310 includes an interface circuit adapted to a communication standard of short-range wireless communication such as Wi-Fi or Bluetooth.

The touch panel 320 includes a display panel such as a liquid crystal panel and a touch sensor. The touch panel 320 outputs coordinate information indicating a position of the display panel touched by the user to the second controller 330.

The second controller 330 includes a second storage 340 and a second processor 350.

The second storage 340 includes a RAM and a ROM. The RAM is used for temporary storage of various data and the like. The ROM stores a control program 341 for controlling the operation of the information processing apparatus 300 and setting data 343.

The second processor 350 is an arithmetic processing device configured by a CPU or an MPU.

The second controller 330 causes the touch panel 320 to display a menu screen and receives selection of a shape condition and an installation condition.

When receiving the selection of the shape condition and the installation condition, the second controller 330 selects, according to the setting data 343, geometric correction processing corresponding to the received shape condition and the received installation condition. The second controller 330 transmits information concerning the selected geometric correction processing to the projector 100.

When receiving the information concerning the geometric correction processing from the information processing apparatus 300, the first controller 170 of the projector 100 causes the projection surface 10 to display a user interface of the geometric correction processing indicated by the received information.

The second controller 330 of the information processing apparatus 300 executes processing explained below.

The second controller 330 receives selection of one of the first projection surface shape and the second projection surface shape as the shape of the projection surface 10 onto which image light is projected.

When receiving the selection of the first projection surface shape, the second controller 330 outputs information concerning geometric correction associated with the first projection surface shape to the projector 100.

When receiving the selection of the second projection surface shape, the second controller 330 outputs information concerning geometric correction associated with the second projection surface shape to the projector 100.

With this configuration, one of the first projection surface shape and the second projection surface shape is selected as the shape of the projection surface 10, whereby the user interface for the geometric correction corresponding to the selected first projection surface shape or second projection surface shape is displayed. Accordingly, the user can cause the projector 100 to execute geometric correction corresponding to the shape of the projection surface 10.

When the user selects geometric correction not corresponding to the shape of the projection surface 10, distortion of a projection image is maintained and another kind of geometric correction is performed. Therefore, a time required for the geometric correction can be reduced.

The embodiment explained above is a preferred mode of implementation. However, embodiments of the present disclosure are not limited to the embodiment explained above. Various modified implementations are possible without departing from the gist of the present disclosure.

For example, in the embodiment explained above, the case in which the selection of the shape condition and the installation condition is received is explained. However, for example, in a case on the premise that the projector 100 is installed in the front of the projection surface 10, only the selection of the shape condition may be received.

When the "hollow shape" is selected as the shape condition, the first controller 170 causes the display surface 10 to display the user interface corresponding to the point correction.

When the "projection shape" is selected as the shape condition, the first controller 170 causes the projection surface 10 to display the user interface corresponding to the corner projection correction.

When the "portable screen" is selected as the shape condition, the first controller 170 selects the quick corner correction and the point correction as the geometric correction processing and causes the projection surface 10 to display the user interface corresponding to the quick corner correction.

When the "fixed screen" is selected as the shape condition, the first controller 170 causes the projection surface 10 to display the user interface corresponding to the frame fit correction.

When the proximity installation is selected, after executing the geometric correction processing according to preset correction conditions, the first controller 170 may cause the projection surface 10 to display the menu screen and receive the selection of the shape condition and the installation condition. The first controller 170 causes the projection surface 10 to display the user interface for executing the geometric correction corresponding to the selected shape condition and the selected installation condition.

The functional units of the projector 100 shown in FIGS. 1 and 10 indicate functional components. Specific implementation forms of the functional units are not particularly limited. That is, hardware individually corresponding to the functional units does not always need to be implemented. It is naturally possible that one processor executes a program to realize functions of a plurality of functional units. A part of functions realized by software in the embodiment may be realized by hardware or a part of functions realized by hardware in the embodiment may be realized by software. Besides, specific detailed configurations of the other units of the projector 100 can also be optionally changed without departing from the gist of the present disclosure.

The processing units of the flowchart shown in FIG. 9 are divided according to main processing contents in order to facilitate understanding of the processing of the projector 100. The present disclosure is not limited by a way of the division and names of the processing units shown in the flowchart of FIG. 9. The processing of the first controller 170 can also be divided into a larger number of processing units according to processing content or can also be divided such that one processing unit includes a larger number of kinds of processing. The processing order of the flowchart explained above is not limited to the illustrated example.

When the control method for the projector is realized using a computer included in the projector 100, a program to be executed by the computer can also be configured in a form of a recording medium or a transmission medium for transmitting the program. The same applies when the control method for the information processing apparatus is realized using a computer included in the information processing apparatus 300. As the recording medium, a magnetic or optical recording medium or a semiconductor memory device can be used. Specifically, examples of the recording medium include portable and stationary recording media such as a flexible disk, a HDD (Hard Disk Drive), a CD-ROM, a DVD, a Blu-ray Disc, a magneto-optical disk, a flash memory, and a card-type recording medium. The recording medium may be a nonvolatile storage device such as a RAM, a ROM, or a HDD that is an internal storage device included in a server apparatus. Blu-ray is a registered trademark.

For example, in the embodiment explained above, the optical modulation apparatus including the liquid crystal panel 163 is illustrated. However, the liquid crystal panel 163 may be a transmissive liquid crystal panel or may be a reflective liquid crystal panel. The optical modulation device may include a digital mirror device instead of the liquid crystal panel 163. The digital mirror device and a color wheel may be combined. The optical modulation device may adopt, other than the liquid crystal panel and the digital mirror device, a component capable of modulating light emitted by a light source.

For example, in the embodiment explained above, the information processing apparatus 300 including the touch panel 320 is illustrated. However, the touch panel 320 may be configured by the liquid crystal panel or the display and a not-shown operation device such as a keyboard or a mouse. The first wireless I/F 200 and the second wireless I/F 310 may be an interface circuit adapted to a communication standard by wire.

What is claimed is:

1. A control method for a projector, comprising:
  receiving selection of one of a first shape and a second shape as a shape of a projection surface onto which image light is projected; and
  receiving selection of one of a first installation state, a second installation state and a third installation state as an installation state of the projector, wherein
    when the first installation state and the first shape are selected, displaying, on the projection surface, a user interface for geometric correction associated with the first installation state and the first shape,
    when the second installation state and the first shape are selected, displaying, on the projection surface, a user interface for geometric correction associated with the second installation state and the first shape,
    when the first installation state and the second shape are selected, displaying, on the projection surface, a user interface for geometric correction associated with the first installation state and the second shape,
    when the second installation state and the second shape are selected, displaying, on the projection surface, a user interface for geometric correction associated with the second installation state and the second shape, when the third installation state is selected, executing geometric correction processing according to a correction condition associated with the third installation state,
    after executing the geometric correction processing, receiving selection of one of the first installation state and the second installation state as an installation state of the projector, and
    the third installation state is a state in which a distance between the projection surface and a projection lens included in the projector satisfies a condition.

2. The control method for the projector according to claim 1, wherein
  the first shape is a shape of the projection surface including a projection, and
  the second shape is a shape of the projection surface including a recess.

3. The control method for the projector according to claim 1, wherein
  the first installation state is an installation state in which an angle formed by an optical axis of a projection lens included in the projector and the projection surface is within a range, and
  the second installation state is an installation state in which the angle formed by the optical axis of the projection lens and the projection surface is outside the range.

4. A control method for an information processing apparatus, comprising:
  receiving selection of one of a first shape and a second shape as a shape of a projection surface onto which image light is projected;
  receiving selection of one of a first installation state, a second installation state and a third installation state as an installation state of the projector, wherein
    when the first installation state and the first shape are selected, displaying, on the projection surface, a user interface for geometric correction associated with the first installation state and the first shape,
    when the second installation state and the first shape are selected, displaying, on the projection surface, a user interface for geometric correction associated with the second installation state and the first shape,
    when the first installation state and the second shape are selected, displaying, on the projection surface, a user interface for geometric correction associated with the first installation state and the second shape,
    when the second installation state and the second shape are selected, displaying, on the projection surface, a user interface for geometric correction associated with the second installation state and the second shape,
    when the third installation state is selected, executing geometric correction processing according to a correction condition associated with the third installation state,
    after executing the geometric correction processing, receiving selection of one of the first installation state and the second installation state as an installation state of the projector, and
    the third installation state is a state in which a distance between the projection surface and a projection lens included in the projector satisfies a condition.

5. A projector comprising:
  an optical device; and
  at least one processor programmed to execute:

receiving operation for selecting of one of a first shape and a second shape a shape of a projection surface onto which image light is projected;

receiving selection of one of a first installation state, a second installation state and a third installation state as an installation state of the projector, and when the first installation state and the first shape are selected, displaying, on the projection surface, a user interface for geometric correction associated with the first installation state and the first shape, when the second installation state and the first shape are selected, displaying, on the projection surface, a user interface for geometric correction associated with the second installation state and the first shape, when the first installation state and the second shape are selected, displaying, on the projection surface, a user interface for geometric correction associated with the first installation state and the second shape, when the second installation state and the second shape are selected, displaying, on the projection surface, a user interface for geometric correction associated with the second installation state and the second shape, when the third installation state is selected, executing geometric correction processing according to a correction condition associated with the third installation state, after executing the geometric correction processing, receiving selection of one of the first installation state and the second installation state as an installation state of the projector, and the third installation state is a state in which a distance between the projection surface and a projection lens included in the projector satisfies a condition.

6. The control method for the projector according to claim 1, wherein the user interface for geometric correction associated with the first shape includes a user interface for a first manual geometric correction and a user interface for a second manual geometric correction, displaying, on the projection surface, the user interface for geometric correction associated with the first shape includes:

when an installation state of the projector is an oblique installation, receiving an operation on the user interface for the first manual geometric correction; and after the first manual geometric correction is performed based on the operation, displaying, on the projection surface, the user interface for the second manual geometric correction which is different from the user interface for the first manual geometric correction.

\* \* \* \* \*